United States Patent
Bartley et al.

(10) Patent No.: US 7,701,244 B2
(45) Date of Patent: Apr. 20, 2010

(54) FALSE CONNECTION FOR DEFEATING MICROCHIP EXPLOITATION

(75) Inventors: Gerald K Bartley, Rochester, MN (US); Darryl J Becker, Rochester, MN (US); Paul E Dahlen, Rochester, MN (US); Philip R Germann, Oronoco, MN (US); Andrew B Maki, Rochester, MN (US); Mark O Maxson, Mantorville, MN (US); John E. Sheets, II, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/181,367

(22) Filed: Jul. 29, 2008

(65) Prior Publication Data

US 2010/0026336 A1 Feb. 4, 2010

(51) Int. Cl.
*H03K 19/00* (2006.01)
(52) U.S. Cl. .............................. 326/8; 326/38
(58) Field of Classification Search ............... 326/8, 326/37, 38
See application file for complete search history.

(56) References Cited

U.S. PATENT DOCUMENTS

| | | | |
|---|---|---|---|
| 5,117,457 A | 5/1992 | Comerford et al. | |
| 5,177,352 A | 1/1993 | Carson et al. | |
| 5,790,670 A | 8/1998 | Bramlett | |
| 5,889,306 A | 3/1999 | Christensen et al. | |
| 6,121,659 A | 9/2000 | Christensen et al. | |
| 6,264,108 B1 | 7/2001 | Baentsch | |
| 6,396,400 B1 | 5/2002 | Epstein, III et al. | |
| 7,005,733 B2 | 2/2006 | Kommerling et al. | |
| 7,352,203 B1 * | 4/2008 | Ziomek | 326/8 |

* cited by examiner

*Primary Examiner*—Don P Le
(74) *Attorney, Agent, or Firm*—Toler Law Group

(57) ABSTRACT

An integrated circuit assembly and associated method of detecting microchip tampering may include multiple connections in electrical communication with a conductive layer. Defensive circuitry may inhibit analysis of the microchip where a connection no longer connects to the conductive layer. The defensive circuitry may similarly be initiated where a connection unintended to be in electrical communication with the conductive layer is nonetheless connected.

20 Claims, 3 Drawing Sheets

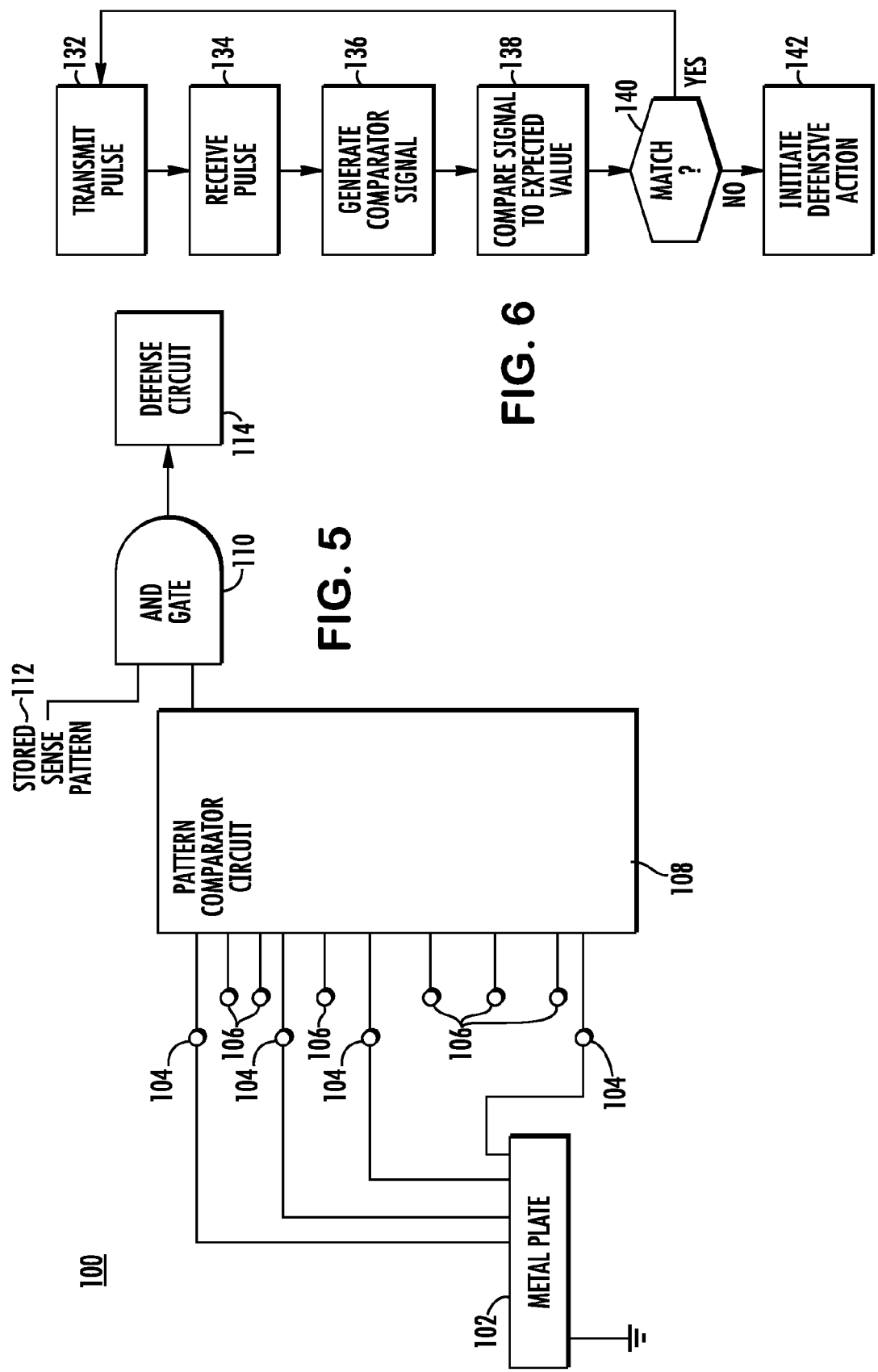

FALSE CONNECTION FOR DEFEATING MICROCHIP EXPLOITATION

FIELD OF THE INVENTION

The present invention relates generally to microchip technologies, and more particularly, to protecting the circuitry and content of microchips.

RELATED APPLICATIONS

The present application relates to co-pending U.S. patent applications entitled "Capacitance-Based Microchip Exploitation Detection" Ser. No. 12/181,342, "Signal Quality Monitoring to Defeat Microchip Exploitation" Ser. No. 12/181,352, "Interdependent Microchip Functionality for Defeating Exploitation Attempts" Ser. No. 12/181,376, "Capacitance Structures for Defeating Microchip Tampering" Ser. No. 12/181,365, "Resistance Sensing for Defeating Microchip Exploitation" Ser. No. 12/181,387, "Continuity Check Monitoring for Microchip Exploitation Detection" Ser. No. 12/181,357, and "Doped Implant Monitoring for Microchip Tamper Detection" Ser. No. 12/181,401, all of which are filed concurrently herewith and which are incorporated by reference in their entireties.

BACKGROUND OF THE INVENTION

Protecting microchip technology deployed in the field is an enormous concern in both military and commercial sectors. Microchips and related devices are routinely acquired by motivated competitors and governments seeking to reverse engineer or otherwise learn the functionality of the technology. Such information is used to make a technological leap in their own devices, or may be used to exploit a perceived weakness in the examined equipment. Sophisticated government and commercial entities thus possess ample strategic and economic motivation to reverse engineer microchip components.

A microchip, or integrated circuit, is a unit of packaged computer circuitry that is manufactured from a material, such as silicon, at a very small scale. Microchips are made for program logic (logic or microprocessors) and for computer memory (Random Access Memory or other memory microchips). Microchips are also made that include both logic and memory, and for special purposes, such as signal, graphics and other processing applications.

An advanced method of reverse engineering select microchip components uses high energy photons, electrons or ions. Focused ion beam processes excite active portions of a microchip to observe how other portions are affected. When used to reverse engineer, these processes are typically done while the microchip is in a powered-on state in order to observe the functionality of the microchip.

Microchip designers in the aerospace, defense and commercial industries routinely implement software and other logic-related techniques to confuse and thwart attempts to probe the active side of the component. For example, safeguard measures integrated within microchips hinder reverse engineering techniques. Microchip designers capitalize on the powered on status required by a reverse engineering process to incorporate a self-destruct or obstructing mechanism into the microchip. The mechanism is triggered by the detection of tampering. When tampering is detected, the power in the circuit is diverted to microchip annihilation or another predetermined measure.

Microchip designers occasionally impede the reverse engineering processes by additionally plating the back of the bulk silicon with a metal layer. While intact, this layer obstructs both the insertion of ions and electrons, and the observation of photons.

While these safeguards provide some protection, motivated exploiters have developed ingenious ways of analyzing the microchip without triggering the safeguard mechanisms. Despite the precautions, the backside of the microchip remains vulnerable to inspection by photons, focused ion beam, or even simple infrared observation. Sophisticated exploitation techniques overcome conventional obstacles by removing the bulk silicon and metallized back layer. For instance, reverse engineering processes may grind away the metallized portion towards implementing a successful focused ion beam operation. In this manner, microchip information may be exploited in a manner that does not initialize a self-destruct feature.

Consequently what is needed is an improved manner of detecting tampering of a microchip.

SUMMARY OF THE INVENTION

The present invention provides an improved method, apparatus and program product for protecting security sensitive circuitry of a microchip from undesired analysis by providing, in part, an electrical path through at least a portion of a microchip that includes security sensitive circuitry, the electrical path comprising a connection in electrical communication with a conductive element, and circuitry in electrical communication with the electrical path and configured to initiate an action for obstructing analysis of the security sensitive circuitry in response to a detected alteration of the electrical path. Electrical communication may include a physical connection, a sequence of physical and/or remote connections, or merely a proximity within which an electrical property may be detected. The circuitry may further be configured to detect the alteration of the electrical path.

In one embodiment, the circuitry may detect the alteration of the electrical path by detecting an interruption in the electrical path. The conductive element may comprise a metallic plate. The connection may be one of a plurality of connections in electrical communication with the conductive element. The plurality of connections contributes to an electronic signature sensed by the circuitry, and the circuitry is further configured to initiate the action in response to an alteration in the electronic signature. The connection may comprise a through-silicon via. Embodiments consistent with the invention may include a signal transmitter configured to transmit a signal to the electrical path. A signal receiver configured to receive a signal from the electrical path may also be included.

Aspects of the invention may include another connection unconnected to the electrical path. The other connection may appear to be connected to the electrical path. The circuitry may further be configured to initiate the action for obstructing the analysis of the security sensitive circuitry in response to the other connection being connected to the conductive element. Embodiments consistent with the invention may include a nonconductive layer positioned between the other connection and the conductive element. The connection and the other connection may comprise different physical dimensions.

According to another aspect of the invention, the connection may be selected from a plurality of connections in electrical connection with the conductive element. Program code may be executed by the circuitry and configured to initiate the action for obstructing analysis of the security sensitive circuitry in response to the detected interruption in the performance of the function. Aspects of the invention may include a machine/computer readable medium bearing the program code. The action may include a shutdown, a spoofing, and/or a self-destruct operation, among others.

Another aspect of the invention includes a plurality of true connections connected to a conductive element and configured to communicate an electronic signature, wherein the disconnection of a true connection of the plurality causes a change in the electronic signature, a false connection unconnected to the conductive element that does not affect the electronic signature when unconnected, and circuitry in electrical communication with the plurality of true connections and configured to initiate an action for obstructing analysis of security sensitive circuitry of a microchip in response to a detected alteration of the electrical signature. The circuitry is further configured to initiate the action in response to the false connection being connected.

An embodiment of the invention may include a method of protecting security sensitive circuitry of a microchip from undesired analysis, the method comprising detecting an alteration of an electrical path comprising a connection in electrical communication with a conductive element, and initiating an action for obstructing analysis of the security sensitive circuitry in response to the detected alteration of the electrical path.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

BRIEF DESCRIPTION OF THE DRAWINGS

FIG. 5 shows a block diagram of a circuit of an integrated circuit assembly such as is shown in FIG. 1 for identifying and obstructing tampering.

FIG. 6 shows a flowchart having steps executable by the active circuitry of the integrated circuit assembly of FIG. 1 for detecting microchip tampering using an arrangement of through silicon-vias that includes false connections.

DETAILED DESCRIPTION

Figure 1:
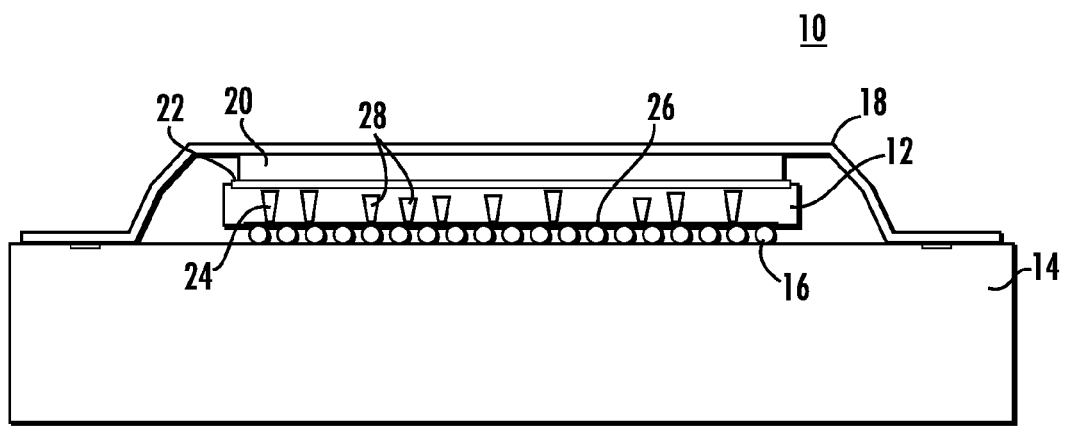
FIG. 1 shows an integrated circuit assembly having multiple actual and false connections to a conductive layer to detect and defeat a reverse engineering operation in a manner consistent with the underlying principles of the present invention.

Embodiments consistent with the present invention include a structure and method that may be used to trigger an action for impeding an integrated circuit exploitation process. An integrated circuit assembly may include multiple connections in electrical communication with a conductive element, or layer. Defensive circuitry may inhibit analysis of the microchip where a connection no longer connects to the conductive layer. The defensive circuitry may similarly be initiated where a connection unintended to be in electrical communication with the conductive layer is nonetheless connected.

Embodiments consistent with the invention decrease the likelihood of successfully reverse engineering a microchip when such an attempt includes grinding down the metallized layer on the backside of the microchip. Through-silicon via technology may be used to contact and sense if the metallized portion on the backside of the chip has been removed during the grinding process. Variable height vias may be incorporated into the structure at multiple locations to prevent or confuse the reconstructing or reconnecting of the thorough-silicon or other vias after the grinding process.

As the microchip is ground, additional vias may appear and complicate the exploitation attempt. If the wrong vias are reconnected during the reverse engineering or analysis effort, detection and defensive circuitry may render the microchip non-functional. In one extreme application, for instance, the microchip may self-destruct.

In another or the same embodiment, one or more of the via locations may be left unconnected with a thin layer of poly on the top of the via. This may leave the via unconnected to the metallized layer, despite having an appearance of being connected. This poly may alternatively induce a relatively higher resistance to the metal layer. In either case, deviation from the original, expected design may then be detected.

Such a feature may be particularly effective where an exploitation effort attempts to map connections between vias by incrementally grinding a small portion of the integrated circuit assembly and taking photographs to record apparent connections. Photographed records would not likely reveal the poly obstruction, rendering the effort unsuccessful.

In one embodiment, a metallized plate is connected to circuitry in the microchip for sensing a tampering event. A continuity check may comprise the method of sensing the exploitation. For additional protection, other vias may be provided that are unconnected to the metal plate.

The backside of the microchip must be ground substantially for the focused ion beam process to be effective. To further confuse and obscure reconstruction of the sensing/detection circuitry, a number of unconnected vias may be incorporated into the microchip. The grinding process may expose these usually shorter, unconnected vias. The introduction of these exposed vias may make it difficult to correctly reconnect vias.

Through-silicon vias conventionally include two different lengths. Since exploitation analysis may grind and take photographs at various depths during the process, vias of multiple lengths would further obscure the analysis. Full length vias may further be electrically isolated from the metal plate with a very thin layer.

After a microchip is ground down, many more vias may be exposed than were actually connected to the metal plate or other conductive layer. Some vias may extend all the way through the microchip and may not connect to the metal plate. Such vias may be surrounded by clearance lands or other insulating material. Further confusion could be introduced by including clearance lands and pads with no via beneath the pad. Many combinations of these vias and pads may be pre-arranged to create a unique signature for detection of tampering by the circuitry on the microchip.

Where desired, additional holes coming from the bulk side of the die may be added. These holes may transverse some distance into the silicon die. As grinding progresses, the holes will disappear. This feature contributes to the confusion of reconstructing the correct pattern.

FIG. 1 shows an integrated circuit assembly 10 including a microchip 12 positioned on a microchip carrier 14. The integrated circuit assembly 10 may include multiple connections in electrical communication with a conductive layer. Defensive circuitry may inhibit analysis of the microchip where a connection no longer connects to the conductive layer. The defensive circuitry may similarly be initiated where a connection unintended to be in electrical communication with the conductive layer is nonetheless connected.

The microchip 12 of FIG. 1 connects to the microchip carrier 14 using die bumps 16. The microchip carrier 14 generally comprises the package in which the microchip 12 is mounted for plugging into (socket mount) or soldering onto (surface mount) a printed circuit board. A protective cover 18 is positioned over the microchip 12 and a thermal layer 20. The cover 18 typically comprises metal, but may include another material suited and positioned to impede access to the microchip 12.

A metallized layer 22, or conductive element, is shown as positioned between the thermal interface layer 20 and the microchip 12. A plurality of vias 24, 28 may selectively connect to the metallized layer 22 and/or active circuitry of the microchip 12. That is, one or more of the vias 24 may contact the metallized layer, while other vias 28 may not. A through-silicon via is a type of via that generally comprises a vertical electrical connection passing through a silicon wafer or die for the purpose of creating three-dimensional packages and circuits. In embodiments consistent with the present invention, the vias 24, 28 may be of multiple lengths, and some vias 28 may not contact the metallized layer 22 used for the tamper sensing circuit.

This arrangement of both connected vias 24 and false, or decoy, vias 28 may complicate reverse engineering processes. For instance, an individual attempting to analyze the microchip 12 may become confused and confounded by either losing track of which vias 24 are actually connected, and which vias 28 should be unconnected.

Figure 2:
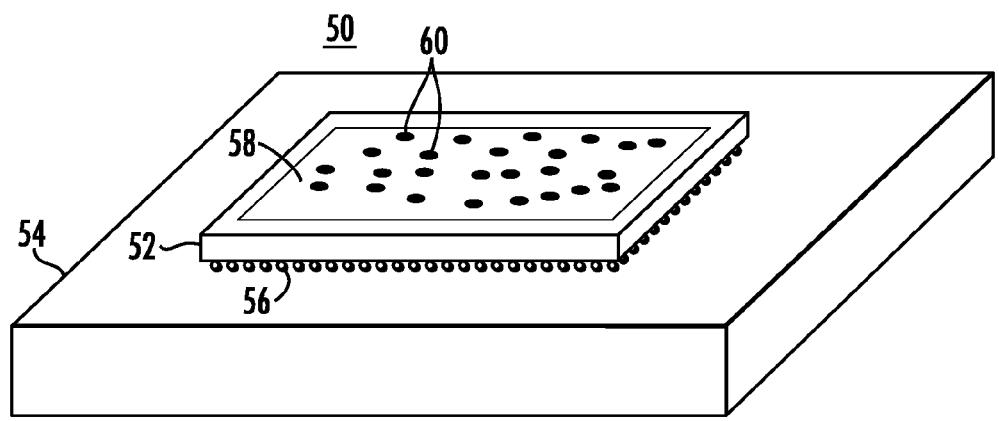
FIG. 2 shows an integrated circuit assembly including multiple connections in electrical communication with a conductive layer and other sensing circuitry for detecting a tampering operation in accordance with the underlying principles of the present invention.

FIG. 2 shows an integrated circuit assembly 50 as it may appear to a reverse engineering team attempting to exploit the functionality of the microchip 52 of the assembly 50. As initially viewed by the exploitation team after any protective cover has been ground off, a metallized layer 58 appears to contact numerous vias 60. As with other embodiments, the microchip 52 may mount onto a microchip carrier 54 using die bumps 56, wire bonds, or any other known mounting mechanism.

Figure 3:
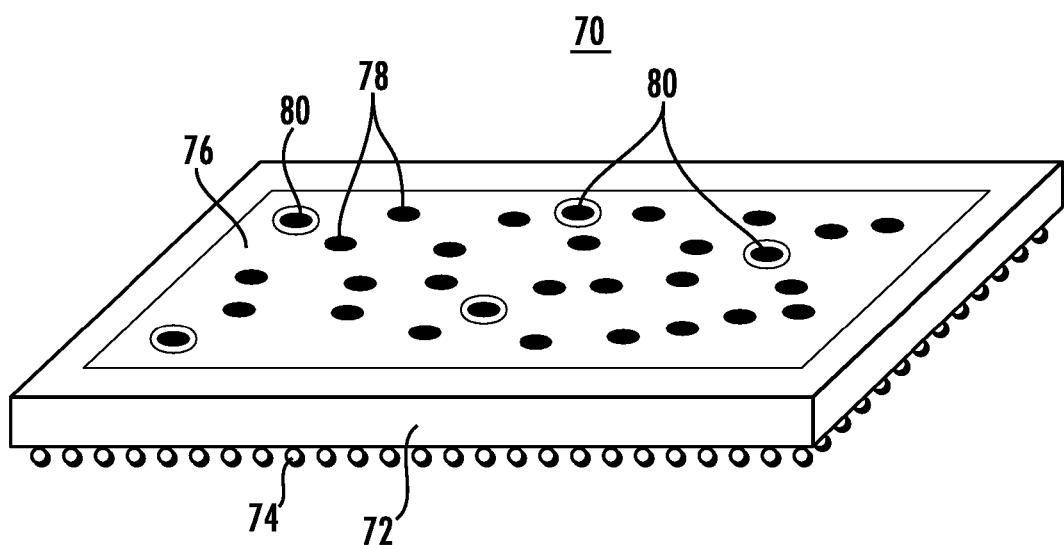
FIG. 3 shows an integrated circuit assembly having multiple actual and hidden false connections to a conductive layer and other sensing circuitry for detecting a tampering operation in accordance with the underlying principles of the present invention.

As the metallized layer 58, microchip material 52 and vias 60 are etched away, additional vias (not apparent at the initial stage) may appear to the exploitation team. The integrated circuit assembly 70 of FIG. 3 shows such hidden vias 80. A microchip 72 of the integrated circuit assembly 70 may mount onto another surface using die bumps 74. In addition to actually contacting, or true, vias 78, false vias 80 may include anti-pads to prevent contact with the metallized layer 76. An anti pad may include nonconductive material, including air or practically any material having relatively poor conducting capability.

The vias 78, 80 may be designed to have different heights so as to selectively contact or not contact the metallized layer 76. As such, a false via 80 may be sized such as to initially appear to be the same as a true via 78. However, the size and/or positioning of the false via 80 may be such that it will not contact the metallized layer.

Figure 4:
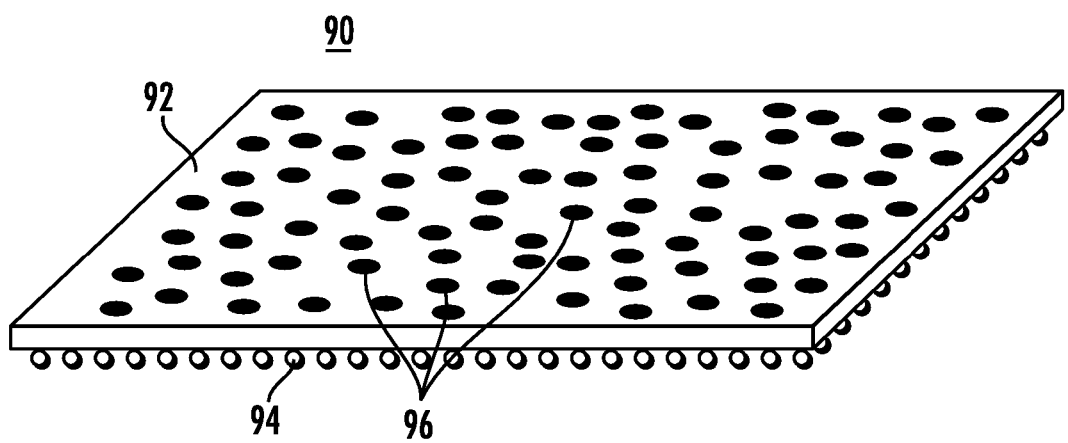
FIG. 4 shows an integrated circuit assembly having multiple false connections to a conductive layer exposed to confound a reverse engineering operation in a manner consistent with the underlying principles of the present invention.

After some removal of the metallized layer 76 and true vias 78, the integrated circuit assembly 70 may appear like the integrated circuit assembly 90 of FIG. 4. As shown in FIG. 4, the surface of the microchip 92 has been removed, along with corresponding layers of false and actually contacting vias 96. As would be apparent to an exploitation team, the difference between false and true silicon vias 96 is nearly imperceptible. The microchip 92 also includes die bumps 94, as shown in FIG. 4, connecting the microchip 92 to an integrated circuit carrier (not shown).

FIG. 5 is a block diagram of a circuit 100 of an integrated circuit assembly 10 such as is shown in FIG. 1, for obstructing and identifying tampering. The circuit 100 includes a grounded metallized plate 102. The metallized plate 102 may contact or otherwise be in electrical communication with a plurality of vias denoted in FIG. 5 by closed connections 104. For purposes of this specification, electrical communication may include physical or electromagnetic communications.

The connections 104 may connect the metallized plate 102 to a pattern comparator circuit 108. The pattern comparator circuit 108 may include any device configured to output a signal indicative of the combination of inputs received at its ports. Other inputs to the pattern comparator circuit 108 include open connections 106. Open connections 106 may correspond to false vias 28. As such, the pattern comparator circuit 108 may receive an electronic signature from the connections 104, 106 corresponding to the design arrangement of false and true vias.

Should one of the (intended) closed connections 104 be input as open to the pattern comparator circuit, the output of the pattern comparator circuit 108 may change. Additionally, should an (intended) open connection 106 be input to the pattern comparator circuit as being closed, the output of the pattern comparator circuit 108 will, again, change. Such may be the case where an exploitation effort attempts to mistakenly connect a false via 28.

As shown in FIG. 5, the pattern comparator circuit 108 may provide an input to an AND gate 110. Another input prong of the AND gate 110 may include data corresponding to a designed and stored sense pattern 112. The AND gate 110 may send out a signal when the output of the pattern comparator circuit 108 does not match that of the stored sense pattern 112. That output may initiate a defensive action at a defensive circuit 114.

FIG. 6 is a flowchart 130 having steps executable by the active circuitry of the integrated circuit assembly 10 of FIG. 1 for detecting microchip tampering using an arrangement of vias that includes false connections. Turning more particularly to the flowchart 130, the active circuitry of the microchip 12 may transmit at block 132 a test pulse or signal. The pulse may travel through a path that should correspond to true, connected vias 24. That pulse should not travel through unintended connections corresponding to false vias 28.

The return pulse may be received at 134 by the active circuitry of the microchip 12. The received pulse(s) may correspond to signals received over connections 104, 106 connected to the pattern comparator circuit 108 of FIG. 5.

In response to the received pulse, the pattern comparator circuit 108 may generate at block 136 of FIG. 6 a comparator signal. That comparator signal may be compared at block 138 to an expected value corresponding to the designed arrangement of true and false vias 24, 28. Where there is a match at block 140, the integrated circuit assembly 10 may continue to monitor for tampering at block 132.

Alternatively, where no match is detected, or a matching attempt falls outside of an expected threshold, the microchip 12 may initiate at block 142 a defensive action.

While the invention has and hereinafter will be described in the context of integrated circuit assemblies, those skilled in the art will appreciate that the various embodiments of the invention are capable of being distributed as a program product in a variety of forms, and that the invention applies equally regardless of the particular type of machine/computer readable, signal bearing media used to actually carry out the distribution. For instance, a separate processor incorporated within or otherwise in communication with an integrated circuit assembly may access memory to execute program code functions to identify tampering in a software manner that is consistent with the underlying principles of the present invention. Examples of signal bearing, machine/computer readable media include, but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In general, the routines executed to implement the embodiments of the invention, whether implemented in hardware, as part of an integrated circuit assembly, or as a specific application, component, program, engine, process, programmatic tool, object, module or sequence of instructions, or even a subset thereof, may be referred to herein as an "algorithm," "function," "program code," or simply "program." Program code typically comprises one or more instructions that are resident at various times in various memory and storage devices in a computing system. When read and executed by one or more processors, the program code performs the steps necessary to execute steps or elements embodying the various aspects of the invention. One of skill in the art should appreciate that embodiments consistent with the principles of the present invention may nonetheless use program code resident at only one, or any number of locations.

Those skilled in the art will further recognize that the exemplary environments illustrated in FIGS. 1-6 are not intended to limit the present invention. For instance, while flip chip mounting processes are used in many of the embodiments above for exemplary purposes, embodiments of the invention may have equal applicability to microchip assemblies associated with virtually any other mounting technique. Indeed, those skilled in the art will recognize that other alternative hardware and/or software environments may be used without departing from the scope of the invention.

Moreover, while the present invention has been illustrated by a description of various embodiments and while these embodiments have been described in considerable detail, it is not the intention of the Applicants to restrict, or in any way limit the scope of the appended claims to such detail. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. An apparatus comprising:
an electrical path through at least a portion of a microchip that includes security sensitive circuitry, the electrical path comprising a conductive element in electrical communication with an electrical connection wherein the electrical connection comprises a through-silicon via; and
circuitry in electrical communication with the electrical path and configured to initiate an action for obstructing analysis of the security sensitive circuitry in response to a detected alteration of the electrical path.

2. The apparatus of claim 1, wherein the circuitry is further configured to detect the alteration of the electrical path.

3. The apparatus of claim 2, wherein the circuitry detects the alteration by detecting an interruption in the electrical path.

4. The apparatus of claim 1, wherein the conductive element comprises a metallic plate.

5. The apparatus of claim 1, wherein the electrical connection is one of a plurality of connections in electrical communication with the conductive element.

6. The apparatus of claim 5, wherein the plurality of connections contribute to an electronic signature sensed by the circuitry, and the circuitry is further configured to initiate the action in response to an alteration in the electronic signature.

7. The apparatus of claim 1 further comprising a signal transmitter configured to transmit a signal to the electrical path.

8. The apparatus of claim 1 further comprising a signal receiver configured to receive a signal from the electrical path.

9. The apparatus of claim 1 further comprising another connection unconnected to the electrical path.

10. The apparatus of claim 9, wherein the another connection appears to be connected to the electrical path.

11. The apparatus of claim 9, wherein the circuitry is further configured to initiate the action for obstructing the analysis of the security sensitive circuitry in response to the other connection being connected to the conductive element.

12. The apparatus of claim 9 further comprising a nonconductive layer positioned between the other connection and the conductive element.

13. The apparatus of claim 9, wherein the connection and the other connection comprise different physical dimensions.

14. The apparatus of claim 1, wherein the connection is selected from a plurality of connections in electrical connection with the conductive element.

15. The apparatus of claim 1, further comprising program code executed by the circuitry and configured to initiate the action for obstructing analysis of the security sensitive circuitry in response to the detected interruption in the performance of the function; and a computer readable medium bearing the program code.

16. The apparatus of claim 1, wherein the defensive action includes an operation selected from a group consisting of at least one of: a shutdown, a spoofing and a self-destruct operation.

17. An apparatus comprising:
a plurality of true connections connected to a conductive element and configured to communicate an electronic signature, wherein a disconnection of a true connection of the plurality causes a change in the electronic signature;
a false connection unconnected to the conductive element, wherein the electronic signature is unaffected when the false connection is unconnected; and
circuitry in electrical communication with the plurality of true connections and configured to initiate an action for obstructing analysis of security sensitive circuitry of a microchip in response to a detected alteration of the electrical signature.

18. The apparatus of claim 17, where the circuitry is further configured to initiate the action in response to the false connection being connected.

19. A method of protecting security sensitive circuitry of a microchip from undesired analysis, the method comprising:

detecting an alteration of an electrical path comprising a conductive element in electrical communication with an electrical connection; including within the microchip a false connection that is unconnected, but appears connected, to the electrical path; and initiating an action for obstructing analysis of the security sensitive circuitry in response to the detected alteration of the electrical path.

20. The method of claim 19, wherein at least one of the electrical connection and false connection include a through-silicon via.

\* \* \* \* \*